United States Patent [19]

Kurimoto et al.

[11] Patent Number: 4,879,650
[45] Date of Patent: Nov. 7, 1989

[54] POS REGISTER SYSTEM WITH COMBINED OPTICAL SCANNER AND WEIGHING MACHINE

[75] Inventors: Yukuo Kurimoto; Takayoshi Endo, both of Shizuoka, Japan

[73] Assignee: Tokyo Electric Co., Ltd., Tokyo, Japan

[21] Appl. No.: 925,816

[22] Filed: Oct. 30, 1986

[30] Foreign Application Priority Data

Nov. 7, 1985 [JP] Japan .............................. 60-249372

[51] Int. Cl.⁴ ..................... G07G 1/14; G01G 19/40
[52] U.S. Cl. ............................. 364/405; 177/25.15; 235/383; 364/464.01; 364/466
[58] Field of Search ............... 177/25.15; 235/383; 364/404, 405, 464, 466

[56] References Cited

U.S. PATENT DOCUMENTS

| | | | |
|---|---|---|---|
| 3,899,775 | 8/1975 | Larsen | 364/900 |
| 3,906,208 | 9/1975 | Rogers | 177/25.15 X |
| 4,029,161 | 6/1977 | Foster et al. | 177/25.15 |
| 4,656,344 | 4/1987 | Mergenthaler et al. | 235/383 X |
| 4,661,908 | 4/1987 | Hamano et al. | 364/405 |
| 4,716,281 | 12/1987 | Amacher et al. | 235/383 |

*Primary Examiner*—Parshotam S. Lall
*Assistant Examiner*—Edward R. Cosimano
*Attorney, Agent, or Firm*—Frishauf, Holtz, Goodman & Woodward

[57] ABSTRACT

A point-of-sale register system includes an electronic cash register connected to a central inventory control unit to serve as a terminal device of a point-of-sale system: an optical scanner, which is electrically connected to the cash register, for optically scanning a bar code mounted on a product; and a weighing machine for weighing a product. The optical scanner includes a receiving section for receiving a product to be weighed thereon. The optical scanner is connected to the weighing machine so that the weight of the product placed on the optical scanner is transmitted to a measuring device of the weighing machine for measurement of the weight of the product. If a bar code is on the product which is placed on the receiving section of the optical scanner, the optical scanner scans the bar code of the product.

5 Claims, 3 Drawing Sheets

POS REGISTER SYSTEM WITH COMBINED OPTICAL SCANNER AND WEIGHING MACHINE

BACKGROUND OF THE INVENTION

The present invention relates to a POS (point-of-sale) register system which includes an electronic cash register connected to a central inventory control unit to serve as a terminal device for a POS system, and an optical scanner, which is electrically connected to the cash register, for optically scanning a bar code mounted on a product.

POS register systems of this type are used in, e.g., supermarkets. As shown in FIG. 1, a POS register unit has a fixed optical scanner 10 having a housing 14. A bar-code scanning window 12 is formed on the upper surface of housing 14. Housing 14 accommodates a laser light source for emitting a laser beam of a unitary wavelength, a laser scanner mechanism for scanning the laser beam from the laser light source onto window 12, a light-receiving means for receiving light reflected from a bar code on a product placed over window 12, and a conversion means fo converting a light pattern received by the lightreceiving means into a corresponding product code. Optical scanner 10 is already known and used widely. Optical scanner 10 is electrically connected to an electronic cash register (not shown in FIG. 1), which is electrically connected to a central inventory control unit (not shown in FIG. 1) to serve as a terminal device of a POS system. The electronic cash register in combination with the bar-code scanner and the central inventory control unit, as described above, is called a POS (point-of-scale) register system and is discriminated from an electronic register which simply stores data inherent to a product, e.g. its price, classification, and the like, and prints the data on a cash register receipt.

In a supermarket, so-called perishable food, e.g., meats, vegetables, fruits, and the like, whose prices are determined in accordance with their weights, are on sale. These foods are weighed by an electronic weighing machine 16 shown in FIG. 2. Machine 16 shown in FIG. 2 has a load cell to measure weight. Machine 16 comprises housing 18, which accommodates a member for supporting the load cell, a measuring means for converting an electrical signal (strain signal), corresponding to a change in voltage produced by deformation of the load cell, into an electrical signal corresponding to a predetermined weight, an arithmetic control means for converting the electrical signal into a price, and a display means for numerically displaying the weight and the price. Display panel 20 used as the display means, and keyboard 22 are arranged on the front surface of housing 18. Keyboard 22 is electrically connected to the measuring means and the arithmetic control means, and is used for adjusting a zero point for weight display or for setting a price per unit weight. Weighing pan 24, on which a product to be weighed is placed, is located above housing 18 in a direction in which gravity acts. Pan 24 is connected to the load cell-supporting member so as to transmit weight of the product placed on pan 24 to the load cell-supporting member.

An electronic weighing machine 16 is often installed at each sales counter for various products whose prices are determined by their weights. Machine 16 is sometimes installed adjacent to a check stand at which the cash register is installed and operated by a cashier. However, in a supermarket, a plurality of check stands are placed to define paths for allowing one customer to pass between adjacent stands. In addition, paper bags for carrying purchased products, plastic film bags made of polyethylene, wrapping paper, and various products necessary for the cashiers, are placed adjacent to the check stands. Therefore, it is difficult to find floor space for installing machine 16. Conventionally, when machine 16 is placed adjacent to the register and is operated by the cashier, it is placed on a shelf arranged above the register. When machine 16 is installed in this manner, the cashier must lift a product onto pan 24, thus increasing a load of the cashier. In addition, lifting up and down a product takes considerable time, thus reducing the work efficiency of the cashier.

SUMMARY OF THE INVENTION

The present invention has been made in consideration of the above situation, and has as its object to provide a POS register system which, even if a weighing machine is installed adjacent to a check stand at which an electronic cash register is located, does not require extra floor space for installing the weighing machine and will not cause an increase in load of the cashier or degradation in his or her work efficiency.

In order to achieve the above object, there is provided a POS register system which includes an electronic cash register connected to a central inventory control unit to serve as a terminal device of a POS system, and an optical scanner, which is electrically connected to the cash register, for optically scanning a bar code on a product. The system further comprises a weighing machine for weighing a product, The optical scanner is located above the weighing machine in a direction in which gravity acts, and is connected to the weighing machine so that the weight of the product placed on a product receiving means of the opticalscanner is transmitted to measuring means of the weighing machine, for measuring the weight of the product on the optical scanner. If a bar code is on the product placed on the optical scanner, the optical scanner also scans the bar code.

In the POS register system with the above arrangement, the weighing machine is preferably an electronic weighing machine electrically connected to the electronic cash register, so that an electrical signal corresponding to a measured weight of the product is supplied to the electronic cash register.

Since the electronic weighing machine of this type can cause the electronic cash register to automatically display and register the measured weight of the product and the price corresponding thereto, a work load of a cashier can be reduced, when compared with a case wherein the cashier manually registers the weight and the price displayed on the electronic weighing machine. Therefore, the work efficiency of the cashier can be improved and errors occurring during registration can be eliminated.

In the POS register system with the above arrangement, the weighing machine further has a weighing pan which is connected to the measuring means and on which a product to be weighed is placed. The optical scanner can be placed on the weighing pan.

With the above arrangement, since a POS register of the present invention can be arranged using a widely used optical scanner and a weighing machine, the manufacturing cost of the POS register system of the present invention can be reduced.

In addition, in the POS register system with the above arrangement, if the weighing machine does not have a weighing pan which is coupled to the measuring means and on which a product to be weighed is placed, and a portion of a housing of the optical scanner can receive the product to be weighed, and can be coupled directly to the measuring means.

With the above arrangement, a more compact combination of the optical scanner and the weighing machine is realized.

DETAILED DESCRIPTION OF THE PREFERRED EMBODIMENT

An embodiment of the present invention and a modification thereof will be described hereinafter with reference to the accompanying drawings.

Figure 1:
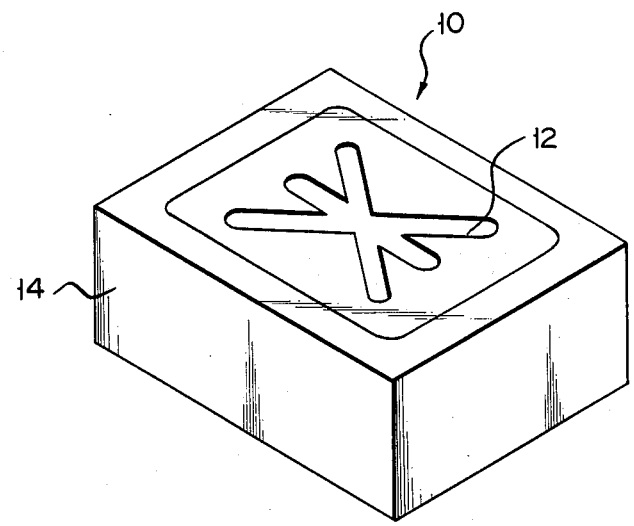
FIG. 1 is a perspective view of an optical scanner, which is widely known, for optically scanning a bar code, used in an embodiment of the present invention.
Figure 2:
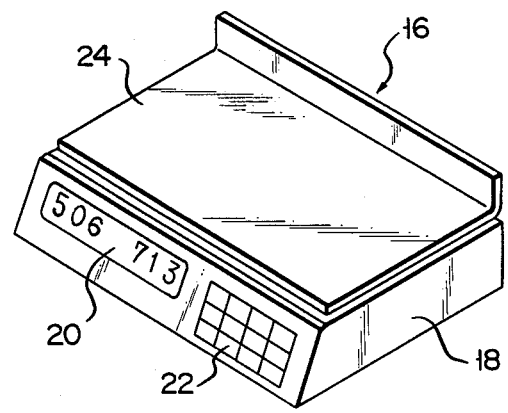
FIG. 2 is a perspective view of an electronic weighing machine, which is widely known, for weighing products, used in the embodiment of the present invention.
Figure 3:
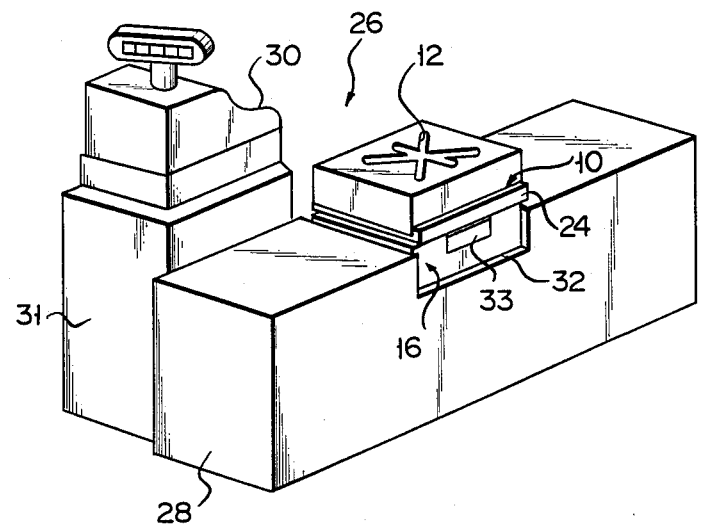
FIG. 3 is a perspective view of a POS register according to the embodiment of the present invention, set on a check stand.

FIG. 3 illustrates a POS register unit 26 according to the present invention, mounted on check stand 28. A basket carrying products purchased by a customer is placed on the upper surface of check stand 28, so that the price of the product to be purchased by the customer is calculated by a checker (not shown). POS register unit 26 has an electronic cash register 30 connected to a central inventory control unit (not shown in FIG. 3) to serve as a terminal device of a POS system. Electronic register 30 is placed on register table 31 installed adjacent to an entrance on one side of check stand 28. Recess 32 is formed in the center portion of the upper surface of stand 28, and electronic weighing machine 16, shown in FIG. 2, is placed on the bottom of recess 32. Optical scanner 10, shown in FIG. 1, for optically scanning a bar code on a product, is arranged on weighing pan 24 (FIG. 2) of electronic weighing machine 16. That is, optical scanner 10 is located above electronic weighing machine 16 in a direction in which gravity acts.

Optical scanner 10 is electrically connected to electronic register 30 so that an electrical signal corresponding to a scanned bar code is supplied to electronic register 30. Electronic weighing machine 16 is also electrically connected to electronic register 30 so that an electrical signal corresponding to the weight of a product is supplied to electronic register 30.

The depth of recess 32 is determined so that the height of the upper surface of optical scanner 10 from the upper surface of check stand 28 is at substantially the same level as that of the basket placed on stand 28.

Second display panel 33 having the same function as that of display panel 20 arranged on the front surface of machine 16 (FIG. 2) is arranged on the back surface of machine 16.

Figure 4:
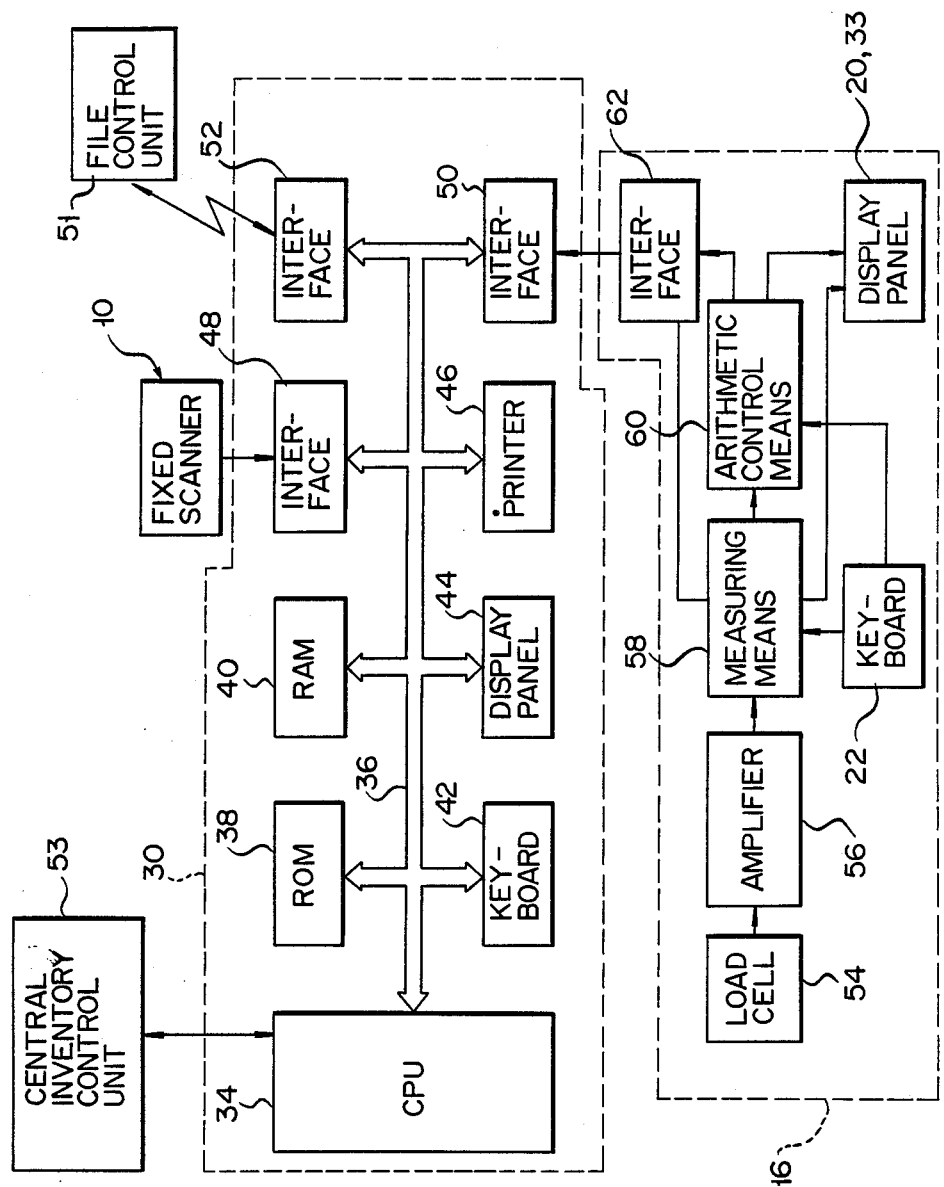
FIG. 4 is a block diagram schematically showing the connections of the electrical or electronic parts of the POS register system shown in FIG. 3.

The block diagram of FIG. 4 schematically illustrates connections of electrical or electronic parts in the POS register unit 26 shown in FIG. 3.

POS register unit 26 comprises a CPU (Central Processing Unit) 34 for performing various arithmetic processing controls, through bus line 36, ROM 38 storing a control program, RAM 40 for storing a product code, sales data, and the like input from optical scanner 10, keyboard 42 on which various sales registration function keys, e.g., number entry keys, an "equals" key, and the like are arranged, display panel 44 for displaying the classification of a sold product, the price of the sold product, and the total amount of the sold products, and printer 46 for printing various data displayed on display panel 44 on a cash register receipt. CPU 34 is connected, through bus line 36, to interface 48 for receiving a product code scanned by optical scanner 10, interface 50 for receiving data from weighing machine 16, and interface 52 for performing data communication with an external file control unit 51 having a product master file for storing product data, e.g., product names, unit prices, and the like corresponding to the product codes. CPU 34 is connected to a central inventory control unit 53 so that electronic register 30 serves as a terminal device of a POS system.

In weighing machine 16, load cell (weighing means) 54 is supported by an elastically deformable member (load cell supporting member) connected to weighing pan 24 and housed in housing 18, so as to be deformed in correspondence with the weight of a product placed on weighing pan 24. A strain signal output from load cell 54 is amplified by amplifier 56, and is then converted to an electrical signal corresponding to a given weight by measuring means 58. Upon reception of the electrical signal corresponding to the given weight from measuring means 58, display panels 20 and 33 numerically display the given weight. The electrical signal corresponding to the given weight and generated from measuring means 58 is converted to an electrical signal corresponding to a given price by arithmetic control means 60. An electrical signal corresponding to a given price and generated from arithmetic control means 60 is also numerically displayed on display panels 20 and 33. Measuring means 58 and arithmetic control means 60 are connected to keyboard 22. Upon operation of keyboard 22, when no product is placed on the upper surface of optical scanner 10 placed on weighing pan 24 of weighing machine 16, a weight electrical signal generated from measuring means 58 in correspondence with the strain signal generated from load cell 54 can set the weight numerically displayed on display panels 20 and 33 to be zero. More specifically, when no product is placed on the upper surface of optical scanner 10 placed on weighing pan 24 of machine 16, the weight numerically displayed on display panels 20 and 33 can be set to be zero. Upon operation of keyboard 22, the relationship between the weight and the price can be determined.

The electrical signal corresponding to a given weight, generated from measuring means 58, and the electrical signal corresponding to a given price, generated from arithmetic control means 60, are supplied to electronic register 30 through interfaces 62 and 50.

Hence, the weight and price can be numerically displayed on display panel 44 of electronic register 30.

In the POS register unit 26 with the arrangement according to the embodiment of the present invention, when the price and other various data of a product, on which a bar code is put, are registered, a cashier need only move a product, with the bar code facing downward, over scanning window 12 of optical scanner 10. Part of various data including its price and associated with the product is displayed on display panel 44 of electronic register 30, and all or given data thereof is sent to the central inventory control unit 53.

In the POS register unit 26 with the arrangement according to the above-described embodiment of the present invention, in order to register a price and various data of a product, such as perishable foods, e.g., meats, vegetables, fruits, and the like, whose prices are determined in accordance with their weights, a code number indicating the classification of a product to be weighed is input from keyboard 22 of weighing machine 16 and, thereafter, the product is placed on optical scanner 10. Thus, the price and other data corresponding to the weight of the product can be displayed on display panels 20 and 33 of weighing machine 16. If the electrical circuit of weighing machine 16 and that of POS register 26 are connected by their interfaces, as shown in FIG. 4, the product data displayed on display panels 20 and 33 is simultaneously displayed on display panel 44 of electronic register 30, and the other data associated with the product code input from keyboard 22 of machine 16 can be processed by electronic register 30 in the same manner as for a product which has a bar code thereon. More specifically, given parts of data associated with a product whose price is determined by its weight are printed on a cash register receipt, and all or given parts of the data is sent to the central inventory control unit 53.

If the electrical circuit of weighing machine 16 and that of electronic register 30 are not connected by their interfaces unlike in FIG. 4, when a cashier inputs a product code, input from keyboard 22 of weighing machine 16 and data is displayed on display panels 20 and 33, to keyboard 43 of electronic register 30, data associated with a product, whose price is determined by its weight, can be processed in the same manner as in the case shown in FIG. 4 wherein the electrical circuit of weighing machine 16 and that of electronic register 30 are connected by their interfaces.

In this illustrated embodiment, where the electrical circuit of weighing machine 16 and that of electronic register 30 are connected by their interfaces, as shown in FIG. 4, if a product having a bar code is place on the upper surface of optical scanner 10, the product data scanned from the bar code is input to electronic register 30 prior to the data sent from weighing machine 16.

As described above, in the POS register unit 26, a sales registration operation for a product having a bar code and that for a product, whose price is determined by its weight, can be performed on the upper surface of optical scanner 10. Therefore, although a weighing machine 16 is installed adjacent to check stand 28 and can be operated by a cashier, it needs no additional floor space. This will not cause an increase in work load on the cashier or decrease in his or her work efficiency.

The present invention is not limited to the above-described embodiments of FIGS. 1-4. Various changes and modifications may be made within the spirit and scope of the invention.

Figure 5:
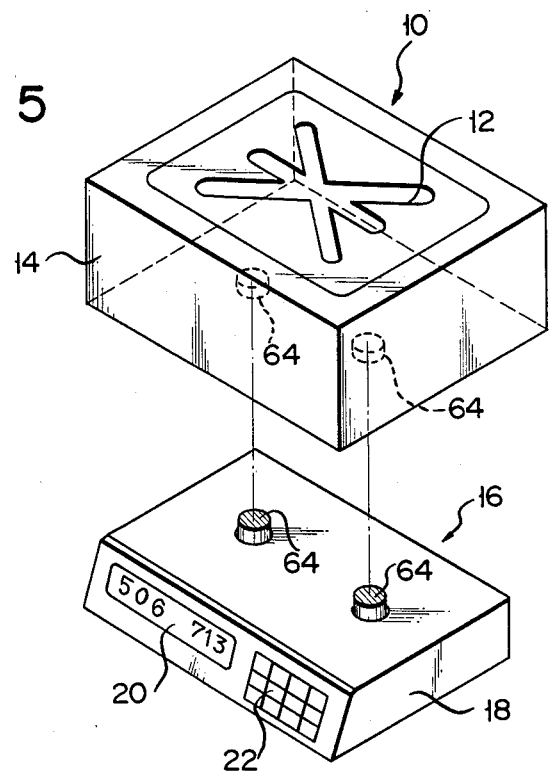
FIG. 5 is a partially exploded, perspective view schematically showing a modification of a combination of the optical scanner and the electronic weighing machine used in the POS register system of the present invention.

For example, as shown in FIG. 5, no weighing pan 24 is arranged on weighing machine 16, and weighing pan-supporting member 64, whose two ends are normally coupled to a weighing pan and a load cell supporting member to transmit the weight of a product placed on the pan to the load cell-supporting member of weighing machine 16, can directly support, and is fixed to, the bottom plate of housing 14 of optical scanner 10 in place of pan 24. With this arrangement, a combination of weighing machine 16 and optical scanner 10 can be made compact when compared with a case wherein pan 24 is arranged on weighing machine 16.

What is claimed is:

1. A point-of-sale register system, comprising:
    an electronic cash register connected to a central inventory control unit to serve as a terminal device of a point-of-sale system;
    a substantially free standing electronic weighing machine electrically connected to said electronic cash register including measuring means for weighing a product, said measuring means being electrically connected to said electronic cash register for supplying to the electronic cash register an electrical signal corresponding to the measured weight of the product, said weighing machine being separate from said cash register and being separable from and removably mounted on an outer surface of a check-out counter;
    optical scanner means mounted on top of said weighing machine, in a direction in which gravity acts, said optical scanner means including:
    receiving means for receiving a product to be weighed thereon, said receiving means transmitting a weight of a product placed on said receiving means to said measuring means of said weighing machine for measuring the weight of the product placed on said receiving means; and
    optical scanning means electrically connected to said electronic cash register for optically scanning a bar code on a product placed on said receiving means and for providing to the electronic cash register an electrical signal corresponding to the scanned bar code; and
    wherein the weight of the product placed on said receiving means of said optical scanner means is measured by said measuring means of said weighing machine, and the bar code on the product placed on said receiving means of said optical scanner means is scanned by said optical scanning means.

2. A point-of-sale register system according to claim 1, wherein said weighing machine comprises a weighing pan which is connected to said measuring means, and said optical scanner means is mounted on said weighing pan of said weighing machine, whereby a product placed on said optical scanner means is weighed.

3. A point-of-sale register system according to claim 1, wherein said weighing machine has no weighing pan for receiving a product to be weighed, and wherein said optical scanner means includes a housing means at least part of which is directly supported on said measuring means of said weighing machine, said housing means of said optical scanner means including a receiving portion for receiving thereon a product to be weighed.

4. A point-of-sale register system, comprising:
    an electronic cash register connected to a central inventory control unit to serve as a terminal device of a point-of-sale system;

a substantially free standing electronic weighing machine electrically connected to said electronic cash register including measuring means for weighing a product, said measuring means being electrically connected to said electronic cash register for supplying to the electronic cash register an electrical signal corresponding to the measured weight of the product, said weighing machine being separate from said cash register and being separable from and removably mounted on an outer surface of a check-out counter, said weighing machine including:

an outer housing means;

said measuring means retained in said outer housing means; and a weight transmitting member coupled to said measuring means and which has a free end which protrudes from said outer housing means; and optical scanner means connected to said free end of said weight transmitting member, said optical scanner means including:

receiving means for receiving a product to be weighed thereon, such that a weight of a product placed on said receiving means is transmitted through said weight transmitting member to said measuring means of said weighing machine for measuring the weight of the product placed on said receiving means; and optical scanning means electrically connected to said electronic cash register for optically scanning a bar code on a product placed on said receiving means and for providing to the electronic cash register an electrical signal corresponding to the scanned bar code; and wherein the weight of the product placed on said receiving means of said optical scanner means is measured by said measuring means of said weighing machine, and the bar code on the product placed on said receiving means of said optical scanner means is scanned by said optical scanning means.

5. A point-of-sale register system according to claim 4, wherein said weighing machine comprises a weighing pan which is connected to said free end of said weight transmitting member, and said optical scanner means is mounted to said weighing pan of said weighing machine, whereby a product placed on said optical scanner means is weighed.

* * * * *